(12) United States Patent
Chen

(10) Patent No.: US 9,411,134 B1
(45) Date of Patent: Aug. 9, 2016

(54) OPTICAL IMAGING LENS ASSEMBLY, IMAGE CAPTURING UNIT AND ELECTRONIC DEVICE

(71) Applicant: LARGAN Precision Co.,Ltd., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/824,837

(22) Filed: Aug. 12, 2015

(30) Foreign Application Priority Data

Jun. 10, 2015 (TW) .............................. 104118839 A

(51) Int. Cl.
G02B 13/18 (2006.01)
G02B 9/60 (2006.01)
G02B 13/00 (2006.01)
H04N 5/232 (2006.01)

(52) U.S. Cl.
CPC .............. *G02B 13/0045* (2013.01); *G02B 9/60* (2013.01); *H04N 5/232* (2013.01)

(58) Field of Classification Search
CPC ....... G02B 9/60; G02B 13/18; G02B 13/0045
USPC ......................................... 359/714, 763, 770
See application file for complete search history.

(56) References Cited

U.S. PATENT DOCUMENTS

| 2013/0016278 | A1* | 1/2013 | Matsusaka | ............. G02B 13/18 348/360 |
| 2013/0107375 | A1* | 5/2013 | Huang | ............... G02B 13/0045 359/714 |
| 2016/0004042 | A1* | 1/2016 | Kubota | .................... G02B 9/62 359/713 |

FOREIGN PATENT DOCUMENTS

| JP | 2014178624 | 9/2014 |
| JP | 2015001644 | 1/2015 |
| JP | 2015022152 | 2/2015 |
| TW | I479187 | 4/2015 |

* cited by examiner

*Primary Examiner* — Scott J Sugarman
(74) *Attorney, Agent, or Firm* — Locke Lord LLP; Tim Tingkang Xia, Esq.

(57) ABSTRACT

An optical imaging lens assembly includes, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element with negative refractive power has an object-side surface being concave in a paraxial region thereof. The fifth lens element with positive refractive power has an object-side surface being convex in a paraxial region thereof and an image-side surface being concave in a paraxial region thereof, wherein the image-side surface of the fifth lens element has at least one convex shape in an off-axis region thereof, and both surfaces thereof are aspheric.

26 Claims, 14 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application 104118839, filed Jun. 10, 2015, which is incorporated by reference herein in its entirety.

BACKGROUND

1. Technical Field

The present disclosure relates to an optical imaging lens assembly, an image capturing unit and an electronic device, more particularly to an optical imaging lens assembly and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a lens structure with less lens elements. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems. Furthermore, due to the compact size of the electronic devices in recent years, the optical systems with conventional arrangement of the lens elements are developed to provide wide field of view, but the conventional arrangement of the lens elements cannot satisfy the requirements of wide field of view, compact size and high image quality simultaneously. Therefore, it is important to develop an optical system having wide field of view, high image quality and compact size.

SUMMARY

According to one aspect of the present disclosure, an optical imaging lens assembly includes, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element with negative refractive power has an object-side surface being concave in a paraxial region thereof. The fifth lens element with positive refractive power has an object-side surface being convex in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric. The optical imaging lens assembly has a total of five lens elements. There is an air gap in a paraxial region between every two of the first lens element, the second lens element, the third lens element, the fourth lens element and the fifth lens element that are adjacent to each other. When an axial distance between the third lens element and the fourth lens element is T34, a central thickness of the fourth lens element is CT4, a focal length of the third lens element is f3, a focal length of the fourth lens element is f4, and the following conditions are satisfied:

$$0 < T34/CT4 < 1.85; \text{ and}$$

$$f4/f3 < 10.0.$$

According to another aspect of the present disclosure, an image capturing unit includes an image sensor and the aforementioned optical imaging lens assembly, wherein the image sensor is disposed on the image side of the optical imaging lens assembly.

According to still another aspect of the present disclosure, an electronic device includes the aforementioned image capturing unit.

According to yet another aspect of the present disclosure, an optical imaging lens assembly includes, in order from an object side to an image side, a first lens element, a second lens element, a third lens element, a fourth lens element and a fifth lens element. The first lens element with negative refractive power has an image-side surface being concave in a paraxial region thereof. The second lens element has positive refractive power. The third lens element has negative refractive power. The fourth lens element with negative refractive power has an object-side surface being concave in a paraxial region thereof and an image-side surface being convex in a paraxial region thereof. The fifth lens element has an image-side surface being concave in a paraxial region thereof, wherein the image-side surface of the fifth lens element has at least one convex shape in an off-axis region thereof, and both of an object-side surface and the image-side surface of the fifth lens element are aspheric. The optical imaging lens assembly has a total of five lens elements. There is an air gap in a paraxial region between every two of the first lens element, the second lens element, the third lens element, the fourth lens element and the fifth lens element that are adjacent to each other. When an axial distance between the third lens element and the fourth lens element is T34, a central thickness of the fourth lens element is CT4, an Abbe number of the first lens element is V1, an Abbe number of the third lens element is V3, an Abbe number of the fourth lens element is V4, and the following conditions are satisfied:

$$0 < T34/CT4 < 1.85; \text{ and}$$

$$V1 + V3 + V4 < 120.$$

According to yet another aspect of the present disclosure, an image capturing unit includes an image sensor and the aforementioned optical imaging lens assembly, wherein the image sensor is disposed on the image side of the optical imaging lens assembly.

According to yet another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
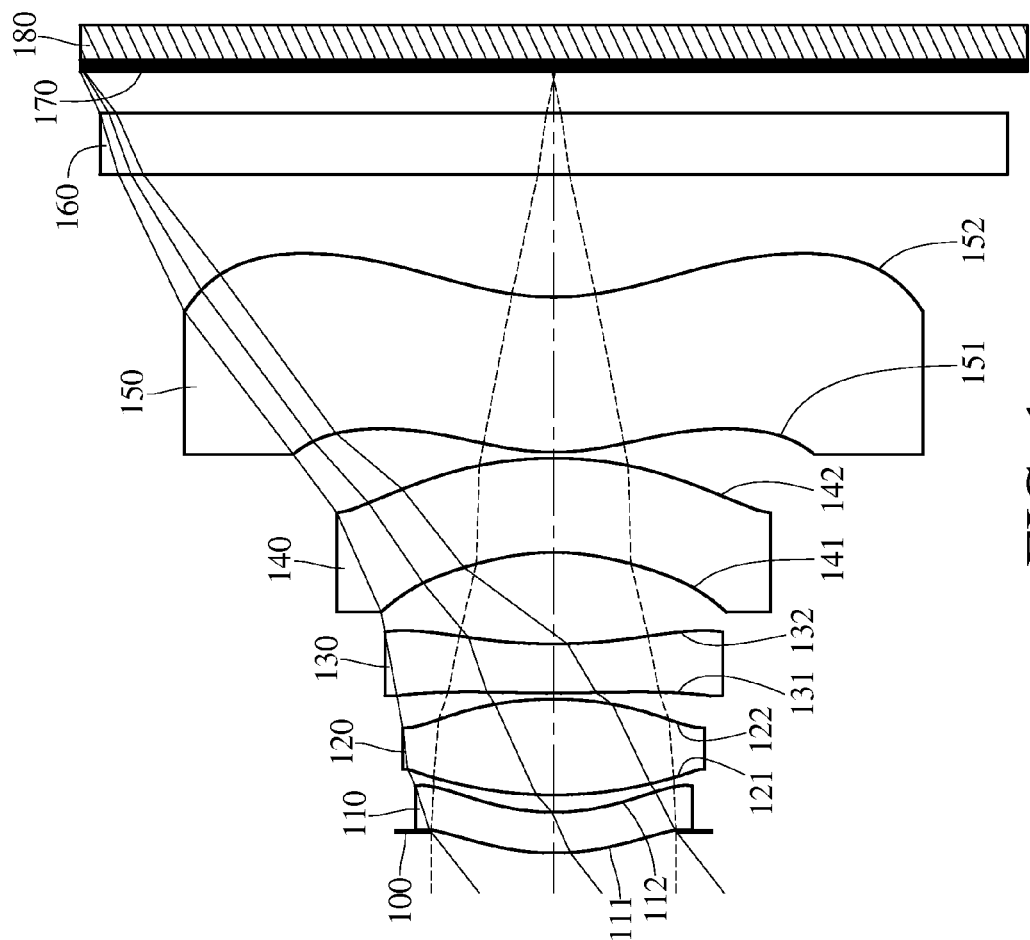
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element and a fifth lens element. The optical imaging lens assembly has a total of five lens elements.

According to the present disclosure, there is an air gap in a paraxial region arranged between every two of the first lens element, the second lens element, the third lens element, the fourth lens element and the fifth lens element that are adjacent to each other. That is, each of the first through fifth lens elements of the optical imaging lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, having an air gap in a paraxial region between every two of the lens elements that are adjacent to each other in the present disclosure is favorable for avoiding problems generated by the cemented lens elements.

The first lens element with negative refractive power has an image-side surface being concave in a paraxial region thereof. The image-side surface of the first lens element can have at least one convex shape in an off-axis region thereof. Therefore, it is favorable for enlarging the field of view so as to capture more of the image scene.

The second lens element has positive refractive power. Therefore, the arrangement of the refractive power of the first lens element and the second lens element is favorable for easily capturing an incident light from the peripheral region of the image scene so as to provide a wider field of view and improve the image quality.

The third lens element with negative refractive power can have an image-side surface being concave in a paraxial region thereof. At least one of an object-side surface and the image-side surface of the third lens element can have at least one inflection point. Therefore, it is favorable for correcting the aberration at the peripheral region of the image so as to improve the image quality.

The fourth lens element with negative refractive power has an object-side surface being concave in a paraxial region thereof. The fourth lens element can have an image-side surface being convex in a paraxial region thereof. Therefore, the arrangement of the refractive power of the third lens element and the fourth lens element is favorable for correcting the field curvature resulting from the second lens element and reducing a total track length of the optical imaging lens assembly so as to maintain a compact size thereof. Furthermore, it is favorable for effectively correcting the Petzval sum so as to improve the flatness of an image surface.

The fifth lens element can have positive refractive power. The fifth lens element can have an object-side surface being convex in a paraxial region thereof. The fifth lens element has an image-side surface being concave in a paraxial region thereof, and the image-side surface of the fifth lens element has at least one convex shape in an off-axis region thereof. Therefore, it is favorable with the principal point being positioned away from the image side of the optical imaging lens assembly for reducing a back focal length, thereby maintaining a compact size thereof. Furthermore, it is favorable for effectively reducing the incident angle of the light projecting onto the image sensor so as to improve the image-sensing efficiency of the image sensor, thereby effectively correcting the aberration of the off-axis field.

When an axial distance between the third lens element and the fourth lens element is T34, a central thickness of the fourth lens element is CT4, the following condition is satisfied: $0<T34/CT4<1.85$. Therefore, it is favorable for preventing the fourth lens element from molding problems and the axial distance between the third lens element and the fourth lens element from becoming too large, thereby keeping the optical imaging lens assembly compact. Preferably, the following condition can also be satisfied:

$$0.30<T34/CT4<1.65.$$

When a focal length of the third lens element is f3, a focal length of the fourth lens element is f4, the following condition is satisfied: $f4/f3<10.0$. Therefore, it is favorable for properly arranging the refractive power of the third lens element and the fourth lens element so as to prevent the imbalanced refractive power distribution of the optical imaging lens assembly, thereby reducing the sensitivity of the optical imaging lens assembly. Preferably, the following condition can also be satisfied:

$$f4/f3<5.0.$$

When an Abbe number of the first lens element is V1, an Abbe number of the third lens element is V3, an Abbe number of the fourth lens element is V4, the following condition is satisfied: $V1+V3+V4<120$. Therefore, it is favorable for correcting the chromatic aberration and the astigmatism. Preferably, the following condition can also be satisfied:

$V1+V3+V4<90$.

When a curvature radius of an object-side surface of the second lens element is R3, a curvature radius of an image-side surface of the second lens element is R4, the following condition can be satisfied: −2.5<R3/R4<−0.4. Therefore, it is favorable for balancing the curvatures of the two surfaces of the second lens element so that the shape of the second lens element is more proper, thereby effectively avoiding molding problems.

When a curvature radius of the object-side surface of the fourth lens element is R7, a curvature radius of the image-side surface of the fourth lens element is R8, the following condition can be satisfied: (R7+R8)/(R7−R8)<0. Therefore, it is favorable for improving the capability of astigmatism correction.

When an axial distance between an object-side surface of the first lens element and the image-side surface of the fifth lens element is Td, a sum of axial distances being respectively between every two of the first lens element, the second lens element, the third lens element, the fourth lens element and the fifth lens element that are adjacent to each other is ΣAT, the following condition can be satisfied: 3.6<Td/ΣAT<6.0. In detail, ΣAT is a sum of an axial distance between the first lens element and the second lens element, an axial distance between the second lens element and the third lens element, the axial distance between the third lens element and the fourth lens element, and an axial distance between the fourth lens element and the fifth lens element. Therefore, it is favorable for tightly arranging the lens elements so as to keep the optical imaging lens assembly compact.

When a focal length of the optical imaging lens assembly is f, a focal length of the second lens element is f2, a focal length of the fifth lens element is f5, the following condition can be satisfied: 1.25<(f/f2)+(f/f5)<4.0. Therefore, the positive refractive power of the second lens element and the fifth lens element are favorable for balancing the negative refractive power of the third lens element and the fourth lens element so as to enlarging the field of view and increasing the relative illumination.

When an axial distance between the object-side surface of the first lens element and the image-side surface of the third lens element is Dr1r6, an axial distance between the object-side surface of the fourth lens element and the image-side surface of the fifth lens element is Dr7r10, the following condition can be satisfied: Dr1r6/Dr7r10<1.0. Therefore, the axial distances between lens elements are properly arranged so that it is favorable for assembling the lens elements and keeping the optical imaging lens assembly compact.

When the focal length of the optical imaging lens assembly is f, a focal length of the first lens element is f1, the following condition can be satisfied: −0.25<f/f1<0. Therefore, it is favorable for enlarging the field of view and improving the image quality.

When a central thickness of the second lens element is CT2, a central thickness of the fifth lens element is CT5, the following condition can be satisfied: CT2/CT5<1.40. Therefore, it provides favorable moldability and homogeneity for the lens elements during the injection molding process so as to increase the manufacturing yield rate. Furthermore, it is favorable for properly arranging the thicknesses of the lens elements so as to keep the optical imaging lens assembly compact. Preferably, the following condition can also be satisfied:

$CT2/CT5<1.0$.

According to the present disclosure, an aperture stop can be configured as a front stop or a middle stop. A front stop disposed between an imaged object and the first lens element can produce a telecentric effect by providing a longer distance between an exit pupil and the image surface and thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the optical imaging lens assembly can be made of glass or plastic material. When the lens elements are made of glass material, the refractive power distribution of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an image surface of the optical imaging lens assembly, based on the corresponding image sensor, can be flat or curved, especially a curved surface being concave facing towards the object side of the optical imaging lens assembly.

According to the present disclosure, the optical imaging lens assembly can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the optical imaging lens assembly according to the aforementioned optical imaging lens assembly of the present disclosure, and an image sensor, wherein the image sensor is disposed on the image side of the aforementioned optical imaging lens assembly, that is, the image sensor can be disposed on or near an image surface of the aforementioned optical imaging lens assembly. In some embodiments, the image capturing unit can further include a barrel member, a holding member or a combination thereof.

Figure 14:
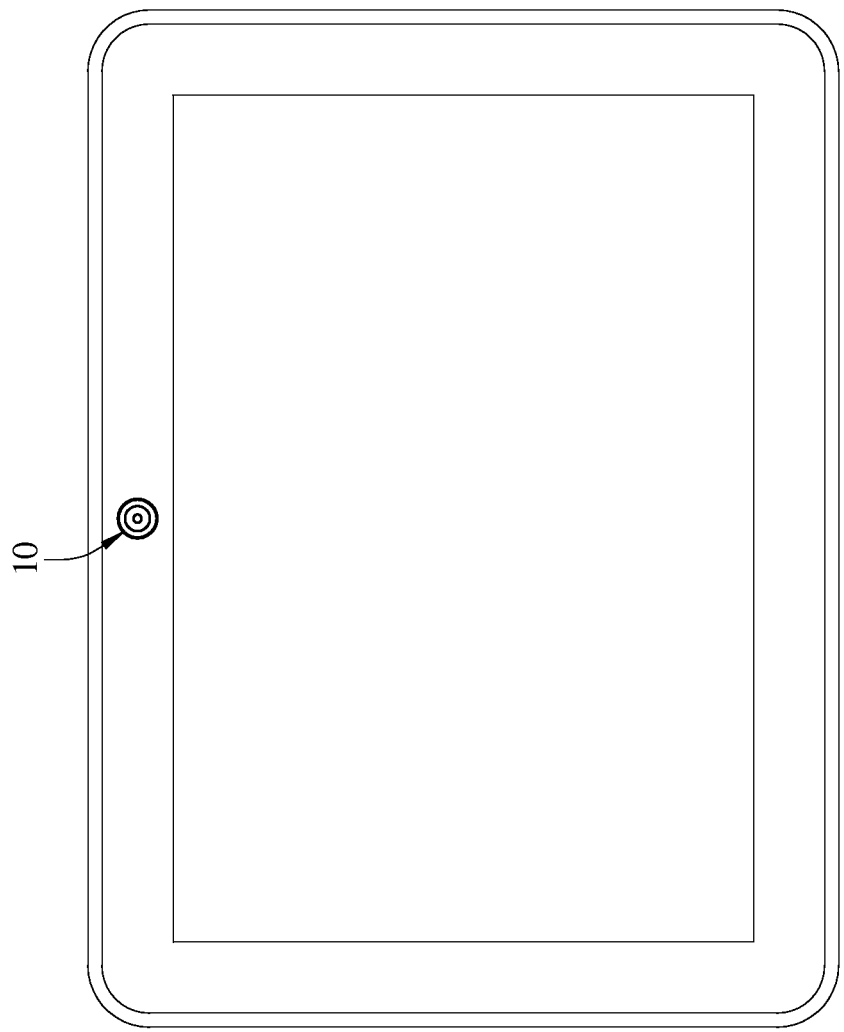
FIG. 14 shows an electronic device according to another embodiment.
Figure 13:
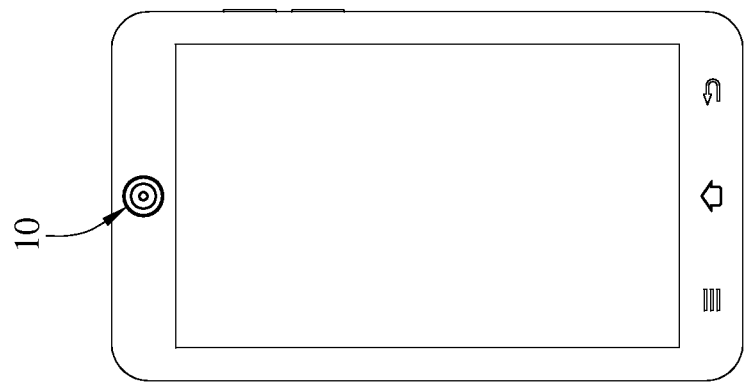
FIG. 13 shows an electronic device according to one embodiment.
Figure 15:
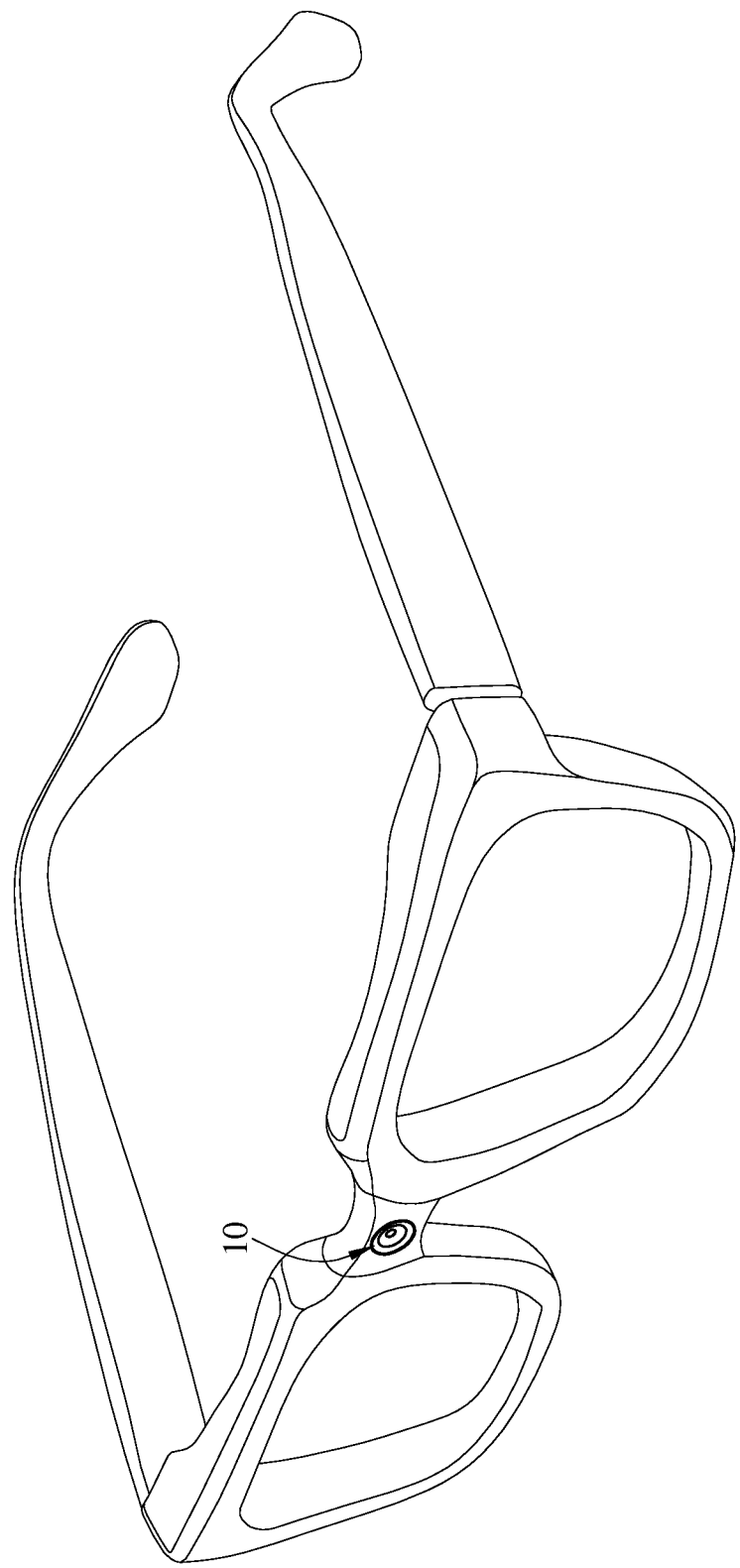
FIG. 15 shows an electronic device according to still another embodiment.

In FIG. 13, FIG. 14, and FIG. 15, an image capturing device 10 may be installed in, but not limited to, an electronic device, including a smart phone (FIG. 13), a tablet personal computer (FIG. 14) or a wearable device (FIG. 15). The electronic devices shown in the figures are only exemplary for showing the image capturing device of present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly is featured with good capability in the correction of aberration and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
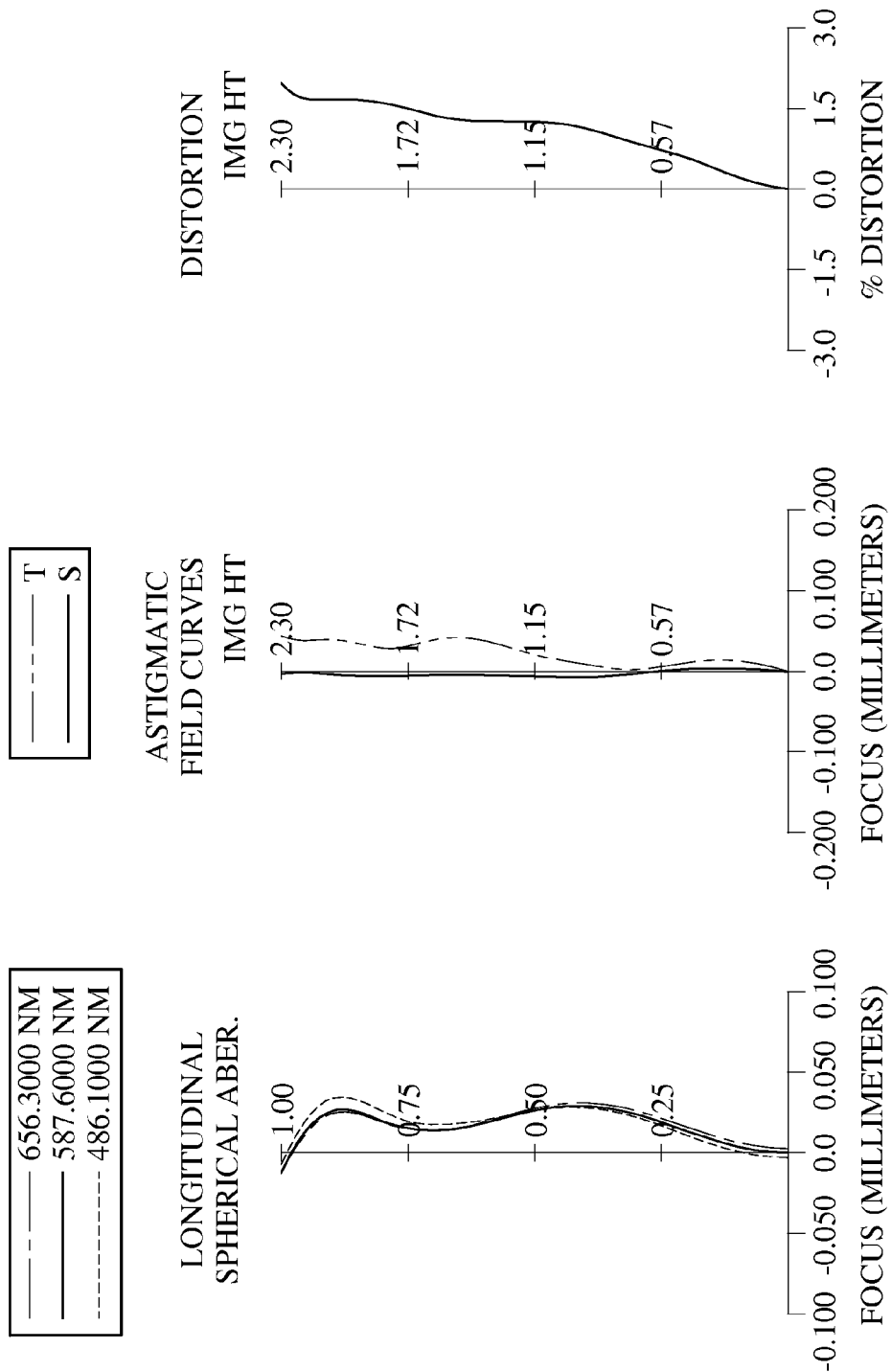
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170, wherein the optical imaging lens assembly has a total of five lens elements (110-150). There is an air gap in a paraxial region between every two of the first lens element 110, the second lens element 120, the third lens element 130, the fourth lens element 140 and the fifth lens element 150 that are adjacent to each other.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has at least one convex shape in an off-axis region thereof.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. Both of the object-side surface 131 and the image-side surface 132 of the third lens element 130 have at least one inflection point.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex shape in an off-axis region thereof.

The IR-cut filter 160 is made of glass and located between the fifth lens element 150 and the image surface 170, and will not affect the focal length of the optical imaging lens assembly. The image sensor 180 is disposed on or near the image surface 170 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=2.85 millimeters (mm); Fno=2.38; and HFOV=38.1 degrees (deg.).

When an Abbe number of the first lens element 110 is V1, an Abbe number of the third lens element 130 is V3, an Abbe number of the fourth lens element 140 is V4, the following condition is satisfied:

$V1+V3+V4=71.4.$

When a central thickness of the second lens element 120 is CT2, a central thickness of the fifth lens element 150 is CT5, the following condition is satisfied:

$CT2/CT5=0.62.$

When an axial distance between the third lens element 130 and the fourth lens element 140 is T34, a central thickness of the fourth lens element 140 is CT4, the following condition is satisfied:

$T34/CT4=0.98.$

When an axial distance between the object-side surface 111 of the first lens element 110 and the image-side surface 132 of the third lens element 130 is Dr1r6, an axial distance between the object-side surface 141 of the fourth lens element 140 and the image-side surface 152 of the fifth lens element 150 is Dr7r10, the following condition is satisfied:

$Dr1r6/Dr7r10=0.82.$

When an axial distance between the object-side surface 111 of the first lens element 110 and the image-side surface 152 of the fifth lens element 150 is Td, a sum of axial distances being respectively between every two of the first lens element 110, the second lens element 120, the third lens element 130, the fourth lens element 140 and the fifth lens element 150 that are adjacent to each other is ΣAT, the following condition is satisfied:

$$Td/\Sigma AT = 4.59.$$

When a curvature radius of the object-side surface 121 of the second lens element 120 is R3, a curvature radius of the image-side surface 122 of the second lens element 120 is R4, the following condition is satisfied:

$$R3/R4 = -1.10.$$

When a curvature radius of the object-side surface 141 of the fourth lens element 140 is R7, a curvature radius of the image-side surface 142 of the fourth lens element 140 is R8, the following condition is satisfied:

$$(R7+R8)/(R7-R8) = -3.57.$$

When the focal length of the optical imaging lens assembly is f, a focal length of the first lens element 110 is f1, the following condition is satisfied:

$$f/f1 = -0.07.$$

When the focal length of the optical imaging lens assembly is f, a focal length of the second lens element 120 is f2, a focal length of the fifth lens element 150 is f5, the following condition is satisfied:

$$(f/f2) + (f/f5) = 2.05.$$

When a focal length of the third lens element 130 is f3, a focal length of the fourth lens element 140 is f4, the following condition is satisfied:

$$f4/f3 = 0.90.$$

The detailed optical data of the 1st embodiment are shown in Table 1 and the aspheric surface data are shown in Table 2 below.

TABLE 1

1st Embodiment
f = 2.85 mm, Fno = 2.38, HFOV = 38.1 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Ape. Stop | Plano | −0.104 |  |  |  |  |
| 2 | Lens 1 | 1.201 (ASP) | 0.200 | Plastic | 1.634 | 23.8 | −41.73 |
| 3 |  | 1.074 (ASP) | 0.084 |  |  |  |  |
| 4 | Lens 2 | 1.929 (ASP) | 0.469 | Plastic | 1.544 | 55.9 | 1.77 |
| 5 |  | −1.754 (ASP) | 0.030 |  |  |  |  |
| 6 | Lens 3 | 8.870 (ASP) | 0.240 | Plastic | 1.634 | 23.8 | −5.49 |
| 7 |  | 2.472 (ASP) | 0.449 |  |  |  |  |
| 8 | Lens 4 | −1.081 (ASP) | 0.460 | Plastic | 1.634 | 23.8 | −4.94 |
| 9 |  | −1.924 (ASP) | 0.030 |  |  |  |  |
| 10 | Lens 5 | 1.145 (ASP) | 0.759 | Plastic | 1.535 | 55.7 | 6.52 |
| 11 |  | 1.310 (ASP) | 0.600 |  |  |  |  |
| 12 | IR-cut filter | Plano | 0.300 | Glass | 1.517 | 64.2 | — |
| 13 |  | Plano | 0.202 |  |  |  |  |
| 14 | Image | Plano | — |  |  |  |  |

Note:
Reference wavelength (d-line) is 587.6 nm.

TABLE 2

Aspheric Coefficients

| | Surface # | | | | |
|---|---|---|---|---|---|
|  | 2 | 3 | 4 | 5 | 6 |
| k = | −3.7812E+00 | −3.1534E+00 | −1.1041E+01 | −6.1364E+00 | −1.0000E+00 |
| A4 = | 2.4356E−02 | 1.0301E−02 | 4.6221E−02 | −2.7699E−01 | −1.8494E−01 |
| A6 = | −1.2956E−01 | −5.5806E−02 | 3.2843E−01 | −9.4722E−02 | 1.8120E−02 |
| A8 = | −1.2907E+00 | −1.0913E+00 | −8.1667E−01 | 1.8323E+00 | 5.4499E−01 |
| A10 = | 1.8998E+00 | 2.4914E−01 | 6.4091E−01 | 1.2848E+00 | −1.4629E+00 |
| A12 = | −2.0658E+00 | −5.8373E−01 | 4.8181E−01 | −2.5858E+01 | 2.0980E+00 |
| A14 = | 3.6984E−10 | −4.0036E−09 | −8.9488E−01 | 6.3397E+01 | −1.5004E+00 |
| A16 = | −8.1921E−11 | −1.0047E−09 | −1.1058E−08 | −4.6730E+01 | −1.6517E−08 |

| | Surface # | | | | |
|---|---|---|---|---|---|
|  | 7 | 8 | 9 | 10 | 11 |
| k = | −7.0093E+00 | −1.2245E+01 | −1.3230E+00 | −1.0442E+01 | −1.9561E+00 |
| A4 = | −1.5008E−02 | −3.6623E−01 | −3.7425E−02 | 3.2021E−02 | −1.8302E−01 |
| A6 = | −1.0619E−01 | 1.9279E+00 | −6.4007E−02 | −7.6764E−01 | 2.0575E−02 |
| A8 = | −5.1237E−01 | −1.1450E+01 | −4.2644E−01 | 1.4524E+00 | 4.7751E−02 |
| A10 = | 1.2096E+00 | 4.1045E+01 | 2.6489E+00 | −1.4337E+00 | −3.6811E−02 |
| A12 = | −1.0150E+00 | −8.3254E+01 | −4.5272E+00 | 8.3083E−01 | 1.2278E−02 |
| A14 = | 1.9554E−01 | 8.5042E+01 | 3.2597E+00 | −2.7685E−01 | −2.0823E−03 |
| A16 = | 4.2790E−08 | −3.3919E+01 | −8.5304E−01 | 4.0936E−02 | 1.4127E−04 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
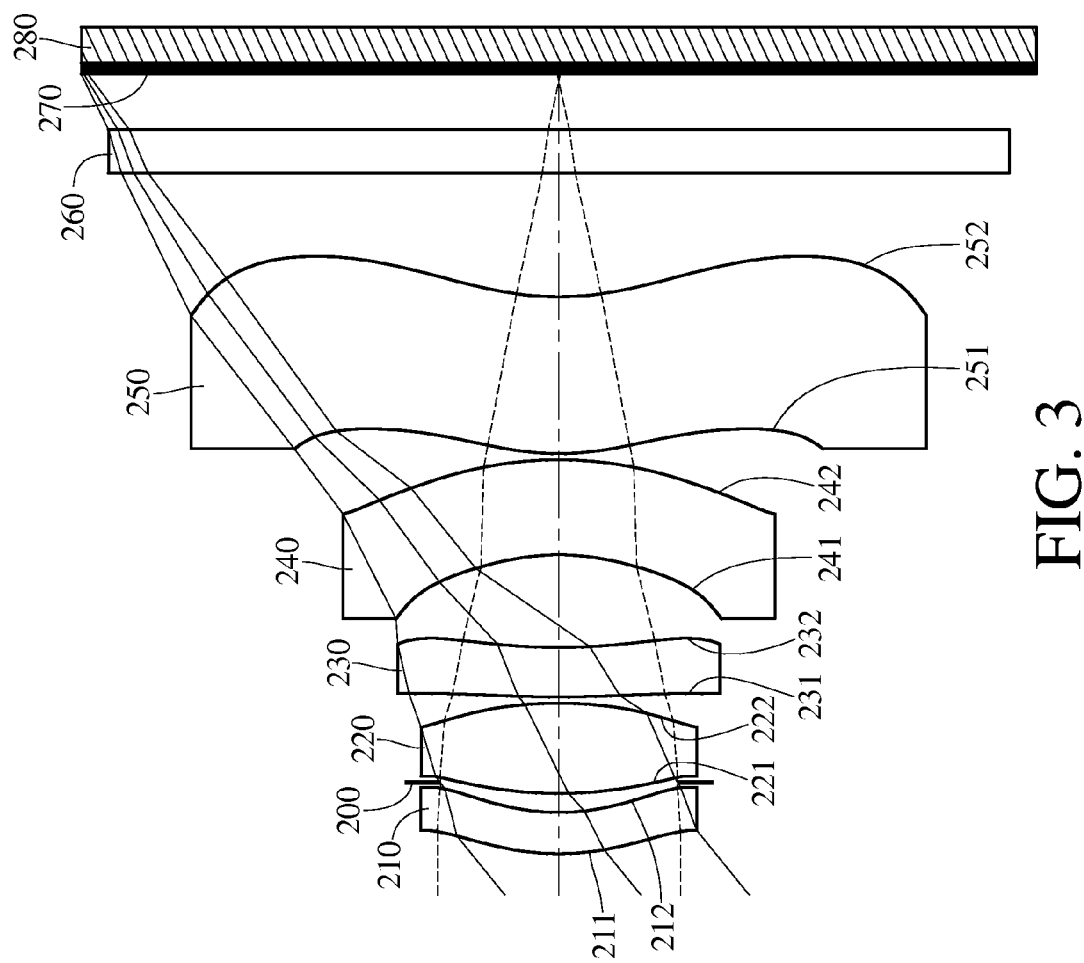
FIG. 3 is a schematic view of an image capturing unit according to the 2nd embodiment of the present disclosure.
Figure 4:
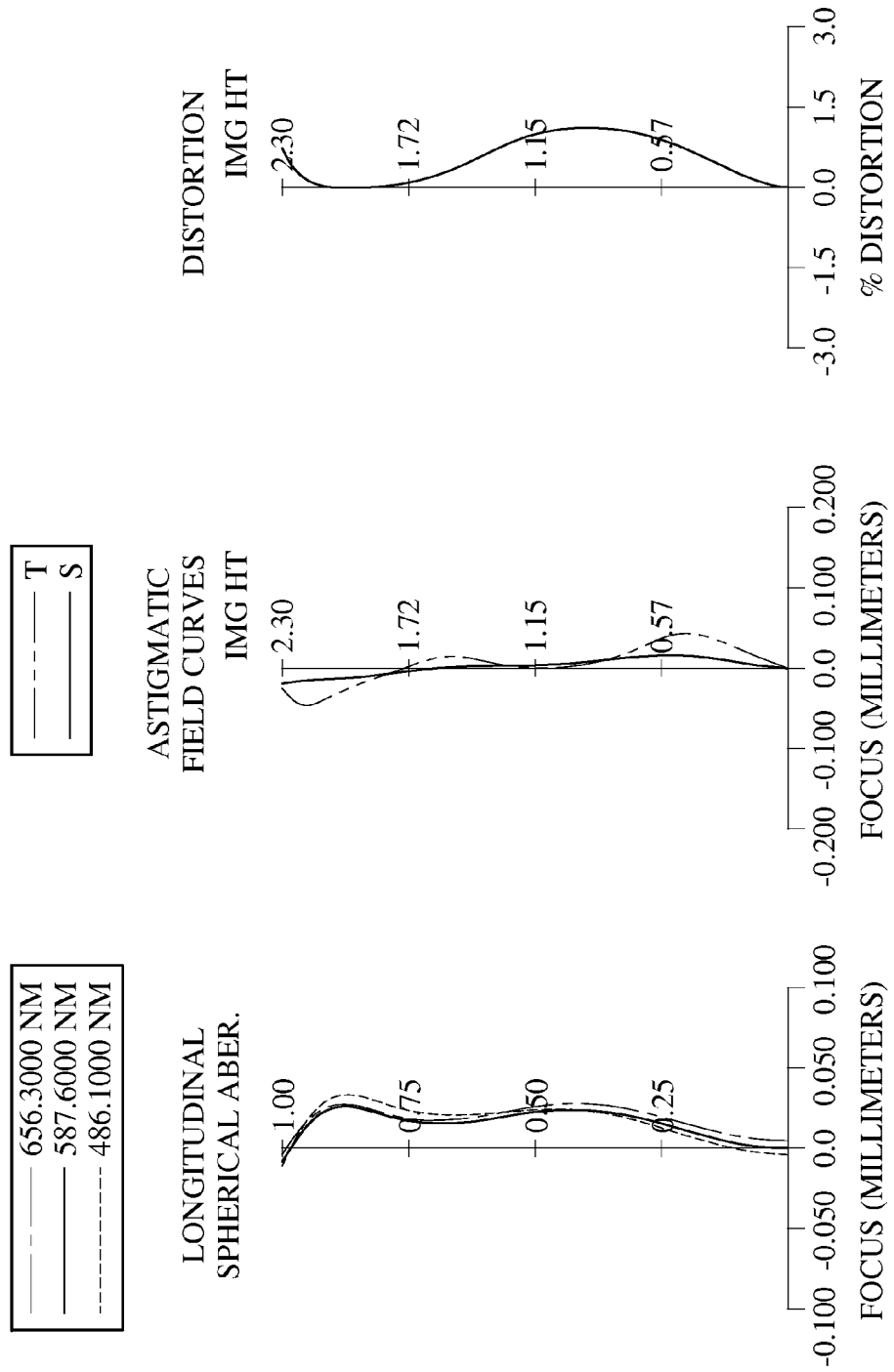
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the optical imaging lens assembly has a total of five lens elements (210-250). There is an air gap in a paraxial region between every two of the first lens element 210, the second lens element 220, the third lens element 230, the fourth lens element 240 and the fifth lens element 250 that are adjacent to each other.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The image-side surface 212 of the first lens element 210 has at least one convex shape in an off-axis region thereof.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. Both of the object-side surface 231 and the image-side surface 232 of the third lens element 230 have at least on inflection point.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex shape in an off-axis region thereof.

The IR-cut filter 260 is made of glass and located between the fifth lens element 250 and the image surface 270, and will not affect the focal length of the optical imaging lens assembly. The image sensor 280 is disposed on or near the image surface 270 of the optical imaging lens assembly.

The detailed optical data of the 2nd embodiment are shown in Table 3 and the aspheric surface data are shown in Table 4 below.

TABLE 3

2nd Embodiment
f = 2.80 mm, Fno = 2.38, HFOV = 39.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.201 (ASP) | 0.200 | Plastic | 1.650 | 21.4 | −23.92 |
| 2 | | 1.041 (ASP) | 0.146 | | | | |
| 3 | Ape. Stop | Plano | −0.054 | | | | |
| 4 | Lens 2 | 1.929 (ASP) | 0.437 | Plastic | 1.544 | 55.9 | 1.92 |
| 5 | | −2.096 (ASP) | 0.030 | | | | |
| 6 | Lens 3 | 4.864 (ASP) | 0.240 | Plastic | 1.650 | 21.4 | −10.43 |
| 7 | | 2.777 (ASP) | 0.449 | | | | |
| 8 | Lens 4 | −1.081 (ASP) | 0.460 | Plastic | 1.650 | 21.4 | −5.51 |
| 9 | | −1.808 (ASP) | 0.030 | | | | |
| 10 | Lens 5 | 1.232 (ASP) | 0.759 | Plastic | 1.544 | 55.9 | 7.77 |
| 11 | | 1.361 (ASP) | 0.600 | | | | |
| 12 | IR-cut filter | Plano | 0.210 | Glass | 1.517 | 64.2 | — |
| 13 | | Plano | 0.267 | | | | |
| 14 | Image | Plano | — | | | | |

Note:
Reference wavelength (d-line) is 587.6 nm.

TABLE 4

Aspheric Coefficients

| Surface # | | | | | |
|---|---|---|---|---|---|
| | 1 | 2 | 4 | 5 | 6 |
| k = | −3.7191E+00 | −3.1349E+00 | −1.0848E+01 | −5.9976E+00 | −2.1138E+01 |
| A4 = | 2.4356E−02 | 1.1222E−02 | 6.5947E−02 | −2.9182E−01 | −1.8494E−01 |
| A6 = | −3.5960E−01 | −2.4664E−01 | 2.0653E−01 | −7.1922E−02 | 9.1943E−02 |
| A8 = | −8.3512E−01 | −1.1057E+00 | −7.6138E−01 | 2.7711E+00 | 4.2805E−01 |
| A10 = | 1.8677E+00 | 3.8822E−01 | −1.2803E−03 | −4.6540E+00 | −1.3727E+00 |
| A12 = | −2.0658E+00 | −5.8373E−01 | 4.8181E−01 | −3.7634E+00 | 2.0980E+00 |
| A14 = | −1.5045E−01 | −9.0052E−09 | −8.9488E−01 | 1.7717E+01 | −1.5004E+00 |
| A16 = | 8.3102E−09 | −2.5293E−09 | −1.1628E−08 | −1.0517E+01 | −1.7890E−08 |

| Surface # | | | | | |
|---|---|---|---|---|---|
| | 7 | 8 | 9 | 10 | 11 |
| k = | −7.0093E+00 | −9.5466E+00 | −4.3462E+00 | −1.0876E+01 | −1.1351E+00 |
| A4 = | −1.4418E−02 | −3.4265E−01 | −2.9822E−02 | 5.2302E−02 | −2.3153E−01 |
| A6 = | −2.4289E−01 | 2.5637E+00 | −7.6082E−02 | −7.5463E−01 | 4.7050E−02 |
| A8 = | −5.1237E−01 | −1.7745E+01 | −4.4137E−01 | 1.4406E+00 | 3.1786E−02 |
| A10 = | 1.2514E+00 | 6.4486E+01 | 2.6431E+00 | −1.4414E+00 | −3.2056E−02 |
| A12 = | −1.2547E+00 | −1.2838E+02 | −4.5271E+00 | 8.3762E−01 | 1.2242E−02 |
| A14 = | 1.9554E−01 | 1.2479E+02 | 3.2593E+00 | −2.7213E−01 | −2.3480E−03 |
| A16 = | −1.6422E−02 | −4.6165E+01 | −8.4909E−01 | 3.7709E−02 | 1.7762E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.80 | Td/ΣAT | 4.49 |
| Fno | 2.38 | R3/R4 | −0.92 |
| HFOV [deg.] | 39.0 | (R7 + R8)/(R7 − R8) | −3.97 |
| V1 + V3 + V4 | 64.2 | f/f1 | −0.12 |
| CT2/CT5 | 0.58 | (f/f2) + (f/f5) | 1.82 |
| T34/CT4 | 0.98 | f4/f3 | 0.53 |
| Dr1r6/Dr7r10 | 0.80 | | |

3rd Embodiment

Figure 5:
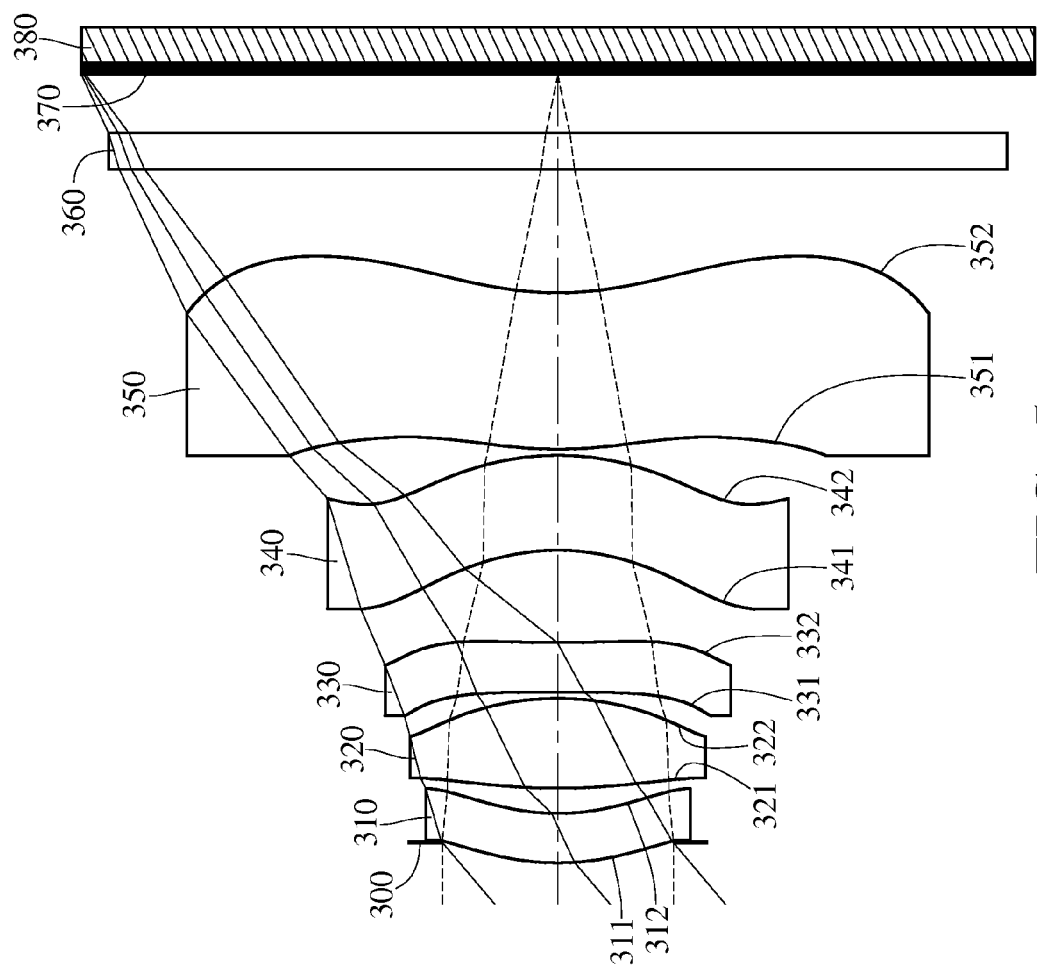
FIG. 5 is a schematic view of an image capturing unit according to the 3rd embodiment of the present disclosure.
Figure 6:
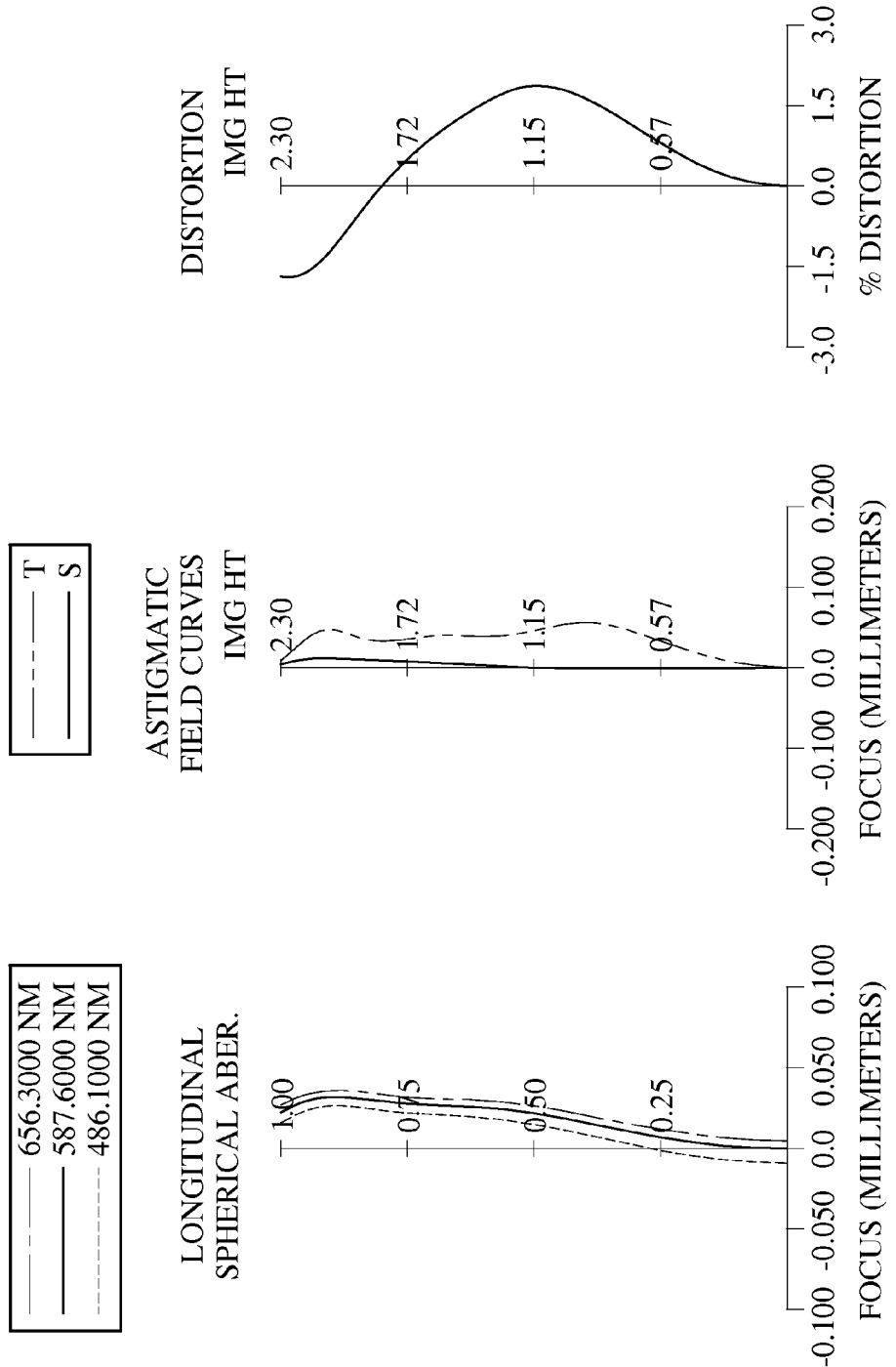
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, an aperture stop 300, a first lens element 310, a second lens element 320, a third lens element 330, a fourth lens element 340, a fifth lens element 350, an IR-cut filter 360 and an image surface 370, wherein the optical imaging lens assembly has a total of five lens elements (310-350). There is an air gap in a paraxial region between every two of the first lens element 310, the second lens element 320, the third lens element 330, the fourth lens element 340 and the fifth lens element 350 that are adjacent to each other.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has at least one convex shape in an off-axis region thereof.

The second lens element 320 with positive refractive power has an object-side surface 321 being convex in a paraxial region thereof and an image-side surface 322 being convex in a paraxial region thereof. The second lens element 320 is made of glass material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. Both of the object-side surface 331 and the image-side surface 332 of the third lens element 330 have at least on inflection point.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex shape in an off-axis region thereof.

The IR-cut filter 360 is made of glass and located between the fifth lens element 350 and the image surface 370, and will not affect the focal length of the optical imaging lens assembly. The image sensor 380 is disposed on or near the image surface 370 of the optical imaging lens assembly.

The detailed optical data of the 3rd embodiment are shown in Table 5 and the aspheric surface data are shown in Table 6 below.

TABLE 5

3rd Embodiment
f = 2.74 mm, Fno = 2.45, HFOV = 40.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.099 | | | | |
| 2 | Lens 1 | 1.201 (ASP) | 0.240 | Plastic | 1.633 | 23.4 | −86.89 |
| 3 | | 1.084 (ASP) | 0.122 | | | | |
| 4 | Lens 2 | 2.837 (ASP) | 0.436 | Glass | 1.542 | 62.9 | 1.82 |
| 5 | | −1.435 (ASP) | 0.030 | | | | |
| 6 | Lens 3 | −70.650 (ASP) | 0.240 | Plastic | 1.633 | 23.4 | −7.68 |
| 7 | | 5.226 (ASP) | 0.449 | | | | |
| 8 | Lens 4 | −1.081 (ASP) | 0.460 | Plastic | 1.633 | 23.4 | −23.97 |
| 9 | | −1.356 (ASP) | 0.030 | | | | |
| 10 | Lens 5 | 1.897 (ASP) | 0.759 | Plastic | 1.555 | 46.7 | −107.70 |
| 11 | | 1.577 (ASP) | 0.600 | | | | |
| 12 | IR-cut filter | Plano | 0.175 | Glass | 1.517 | 64.2 | — |
| 13 | | Plano | 0.285 | | | | |
| 14 | Image | Plano | — | | | | |

Note:
Reference wavelength (d-line) is 587.6 nm.

TABLE 6

Aspheric Coefficients

| | | Surface # | | | |
|---|---|---|---|---|---|
| | 2 | 3 | 4 | 5 | 6 |
| k = | −3.3604E+00 | −4.9454E+00 | −8.2264E+00 | −6.1431E+00 | −1.0000E+00 |
| A4 = | 2.4356E−02 | 1.9284E−01 | −7.4233E−02 | −3.7223E−01 | −3.4306E−01 |
| A6 = | −4.1532E−01 | −1.0986E+00 | −1.1439E−01 | 1.0835E+00 | 8.1156E−01 |
| A8 = | 1.3766E−01 | 1.5465E+00 | −7.4939E−02 | −8.2111E+00 | −5.4264E+00 |
| A10 = | 2.0338E−01 | −2.5663E+00 | 3.3915E−01 | 4.0244E+01 | 1.7293E+01 |
| A12 = | −2.0658E+00 | −6.5288E−02 | 4.8181E−01 | −1.0807E+02 | −2.8855E+01 |
| A14 = | 1.7174E−08 | — | −8.9488E−01 | 1.5041E+02 | 1.6094E+01 |
| A16 = | −8.3517E−10 | — | — | −8.0907E+01 | 4.4967E+00 |

| | | Surface # | | | |
|---|---|---|---|---|---|
| | 7 | 8 | 9 | 10 | 11 |
| k = | −7.0093E+00 | −4.1350E+00 | −2.1185E+00 | −1.3129E+01 | −1.4879E+00 |
| A4 = | −3.2977E−01 | −7.1552E−02 | −7.6368E−02 | −1.4564E−01 | −1.5471E−01 |
| A6 = | −9.3065E−03 | −9.2164E−01 | −1.6927E−01 | −1.7601E−01 | −3.5968E−03 |
| A8 = | −5.1237E−01 | 3.7873E+00 | 4.1038E−01 | 3.6375E−01 | 4.2901E−02 |
| A10 = | 1.0625E+00 | −7.5729E+00 | 5.9615E−01 | −1.7832E−01 | −2.3471E−02 |
| A12 = | −1.2087E+00 | 9.8051E+00 | −1.1965E+00 | −3.8784E−02 | 5.3174E−03 |
| A14 = | 4.3927E−01 | −6.9927E+00 | 6.4074E−01 | 5.8551E−02 | −4.5571E−04 |
| A16 = | 7.2412E−01 | 1.9924E+00 | −1.1320E−01 | −1.3903E−02 | −4.1745E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.74 | Td/ΣAT | 4.38 |
| Fno | 2.45 | R3/R4 | −1.98 |
| HFOV [deg.] | 40.3 | (R7 + R8)/(R7 − R8) | −8.87 |
| V1 + V3 + V4 | 70.2 | f/f1 | −0.03 |
| CT2/CT5 | 0.57 | (f/f2) + (f/f5) | 1.48 |
| T34/CT4 | 0.98 | f4/f3 | 3.12 |
| Dr1r6/Dr7r10 | 0.86 | | |

4th Embodiment

Figure 7:
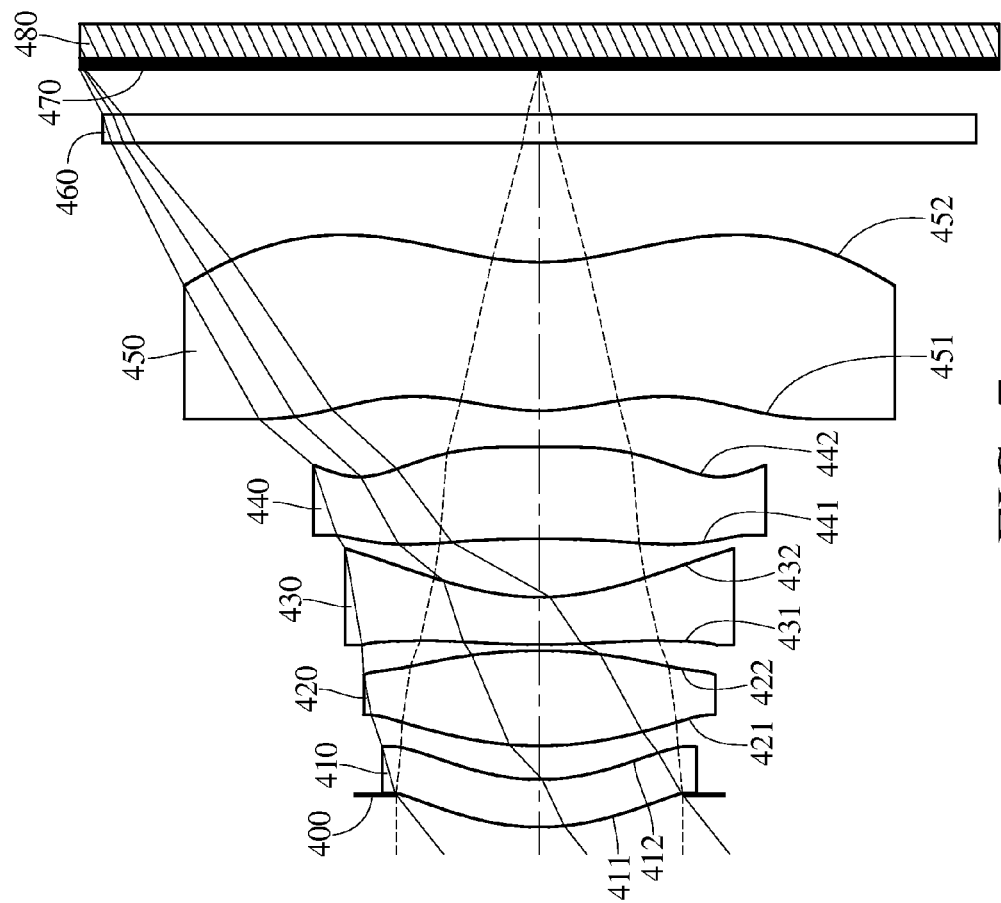
FIG. 7 is a schematic view of an image capturing unit according to the 4th embodiment of the present disclosure.
Figure 8:
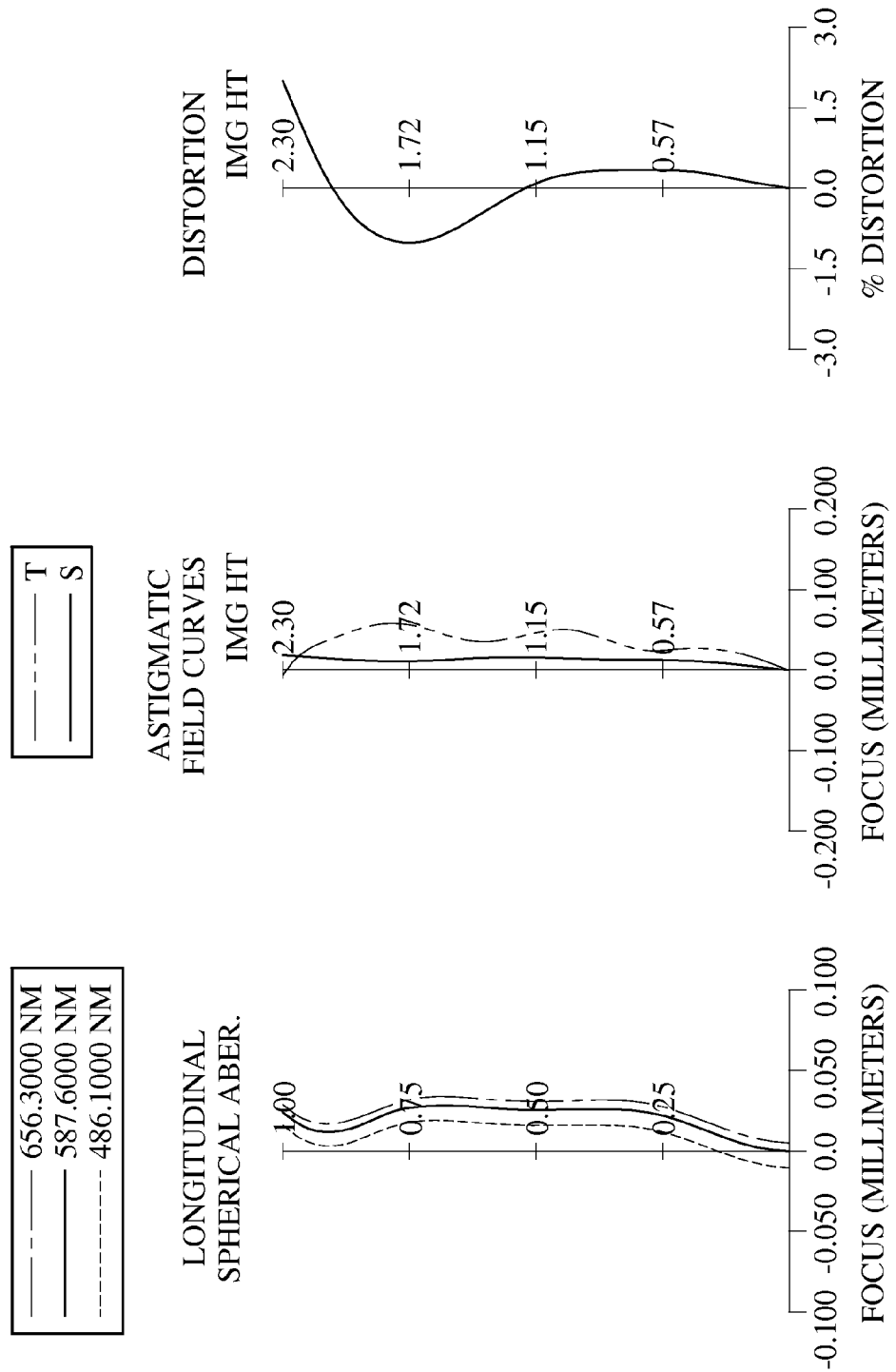
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, an aperture stop 400, a first lens element 410, a second lens element 420, a third lens element 430, a fourth lens element 440, a fifth lens element 450, an IR-cut filter 460 and an image surface 470, wherein the optical imaging lens assembly has a total of five lens elements (410-450). There is an air gap in a paraxial region between every two of the first lens element 410, the second lens element 420, the third lens element 430, the fourth lens element 440 and the fifth lens element 450 that are adjacent to each other.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has at least one convex shape in an off-axis region thereof.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. Both of the object-side surface 431 and the image-side surface 432 of the third lens element 330 have at least on inflection point.

The fourth lens element 440 with negative refractive power has an object-side surface 441 being concave in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex shape in an off-axis region thereof.

The IR-cut filter 460 is made of glass and located between the fifth lens element 450 and the image surface 470, and will not affect the focal length of the optical imaging lens assembly. The image sensor 480 is disposed on or near the image surface 470 of the optical imaging lens assembly.

The detailed optical data of the 4th embodiment are shown in Table 7 and the aspheric surface data are shown in Table 8 below.

TABLE 7

4th Embodiment
f = 2.81 mm, Fno = 1.95, HFOV = 38.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.164 | | | | |
| 2 | Lens 1 | 1.201 (ASP) | 0.240 | Plastic | 1.600 | 60.0 | −51.73 |
| 3 | | 1.069 (ASP) | 0.170 | | | | |
| 4 | Lens 2 | 1.754 (ASP) | 0.480 | Plastic | 1.600 | 60.0 | 1.79 |
| 5 | | −2.501 (ASP) | 0.030 | | | | |
| 6 | Lens 3 | 3.834 (ASP) | 0.240 | Plastic | 1.620 | 30.0 | −3.04 |
| 7 | | 1.233 (ASP) | 0.294 | | | | |
| 8 | Lens 4 | −6.519 (ASP) | 0.462 | Plastic | 1.535 | 55.7 | −7.40 |
| 9 | | 10.328 (ASP) | 0.184 | | | | |
| 10 | Lens 5 | 1.044 (ASP) | 0.749 | Plastic | 1.600 | 60.0 | 4.09 |
| 11 | | 1.330 (ASP) | 0.600 | | | | |
| 12 | IR-cut filter | Plano | 0.145 | Glass | 1.517 | 64.2 | — |
| 13 | | Plano | 0.227 | | | | |
| 14 | Image | Plano | — | — | | | |

Note:
Reference wavelength (d-line) is 587.6 nm.

TABLE 8

Aspheric Coefficients

| | Surface # | | | | |
|---|---|---|---|---|---|
| | 2 | 3 | 4 | 5 | 6 |
| k = | −3.1849E+00 | −3.7931E+00 | −2.9015E+00 | −8.0808E+01 | −1.0000E+00 |
| A4 = | 2.4324E−02 | 4.9079E−02 | −3.1555E−02 | −4.7517E−01 | −2.1844E−01 |
| A6 = | −9.7119E−03 | −2.1026E−01 | 1.4689E−02 | 1.5643E+00 | −9.1888E−02 |
| A8 = | −5.3454E−01 | −1.4743E−01 | −1.5293E−01 | −3.6692E+00 | 8.0042E−01 |
| A10 = | 1.2302E+00 | 7.8287E−02 | 2.0792E−01 | 3.8597E+00 | −3.5121E+00 |
| A12 = | −2.0921E+00 | −2.2311E−01 | 3.1808E−01 | 3.0030E+00 | 9.4048E+00 |
| A14 = | 2.0630E+00 | — | −6.3274E−01 | −8.5497E+00 | −1.1046E+01 |
| A16 = | −1.1526E+00 | — | — | 4.1434E+00 | 4.4894E+00 |

TABLE 8-continued

Aspheric Coefficients

| | Surface # | | | | |
|---|---|---|---|---|---|
| | 7 | 8 | 9 | 10 | 11 |
| k = | −7.0079E+00 | −8.8997E+01 | −1.0000E+00 | −7.7593E+00 | −2.9132E+00 |
| A4 = | 7.9404E−02 | −2.2017E−01 | −1.4658E+00 | −5.6243E−01 | −3.0873E−01 |
| A6 = | −2.9540E−02 | 1.0748E+00 | 4.0000E+00 | 5.8782E−01 | 2.3923E−01 |
| A8 = | −5.1235E−01 | −2.9007E+00 | −7.7043E+00 | −5.0757E−01 | −1.5123E−01 |
| A10 = | 1.2125E+00 | 6.3265E+00 | 1.0097E+01 | 3.8017E−01 | 6.7354E−02 |
| A12 = | −1.1093E+00 | −8.2630E+00 | −7.5769E+00 | −1.8299E−01 | −1.9512E−02 |
| A14 = | 2.9560E−01 | 5.5284E+00 | 2.9103E+00 | 4.7252E−02 | 3.2974E−03 |
| A16 = | 6.6376E−02 | −1.4761E+00 | −4.4606E−01 | −5.0317E−03 | −2.4471E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.81 | Td/ΣAT | 4.20 |
| Fno | 1.95 | R3/R4 | −0.70 |
| HFOV [deg.] | 38.5 | (R7 + R8)/(R7 − R8) | −0.23 |
| V1 + V3 + V4 | 145.7 | f/f1 | −0.05 |
| CT2/CT5 | 0.64 | (f/f2) + (f/f5) | 2.26 |
| T34/CT4 | 0.64 | f4/f3 | 2.43 |
| Dr1r6/Dr7r10 | 0.83 | | |

5th Embodiment

Figure 9:
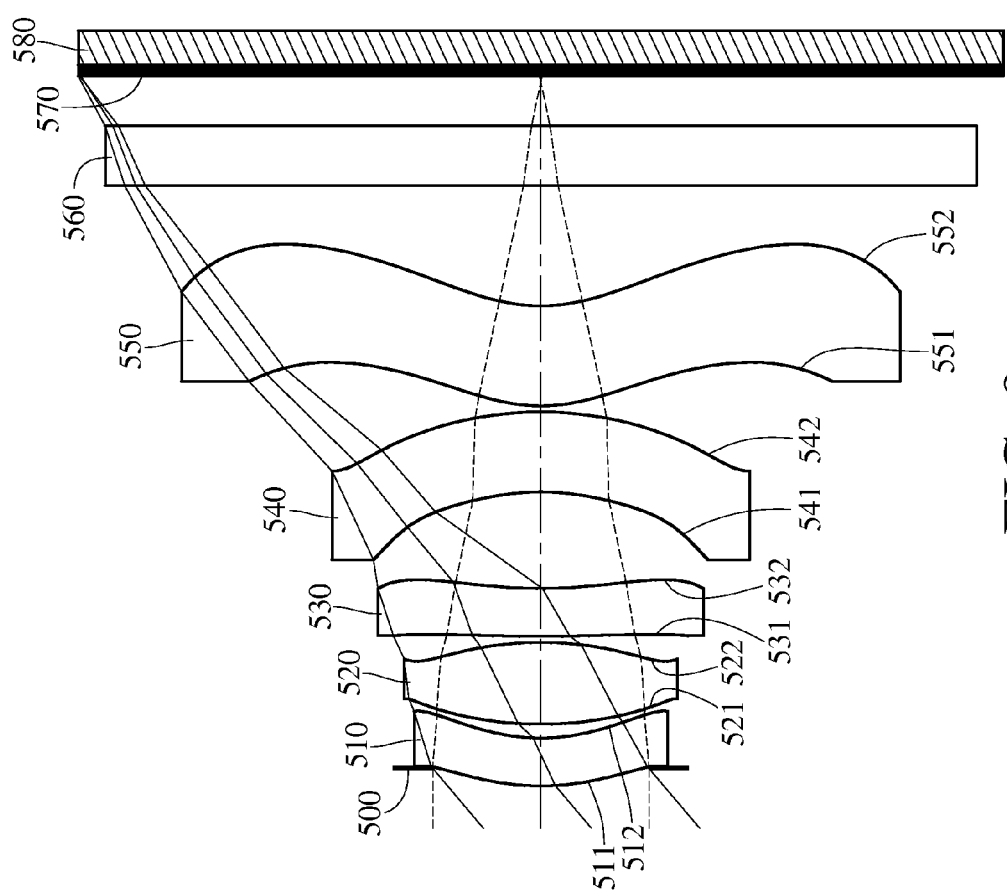
FIG. 9 is a schematic view of an image capturing unit according to the 5th embodiment of the present disclosure.
Figure 10:
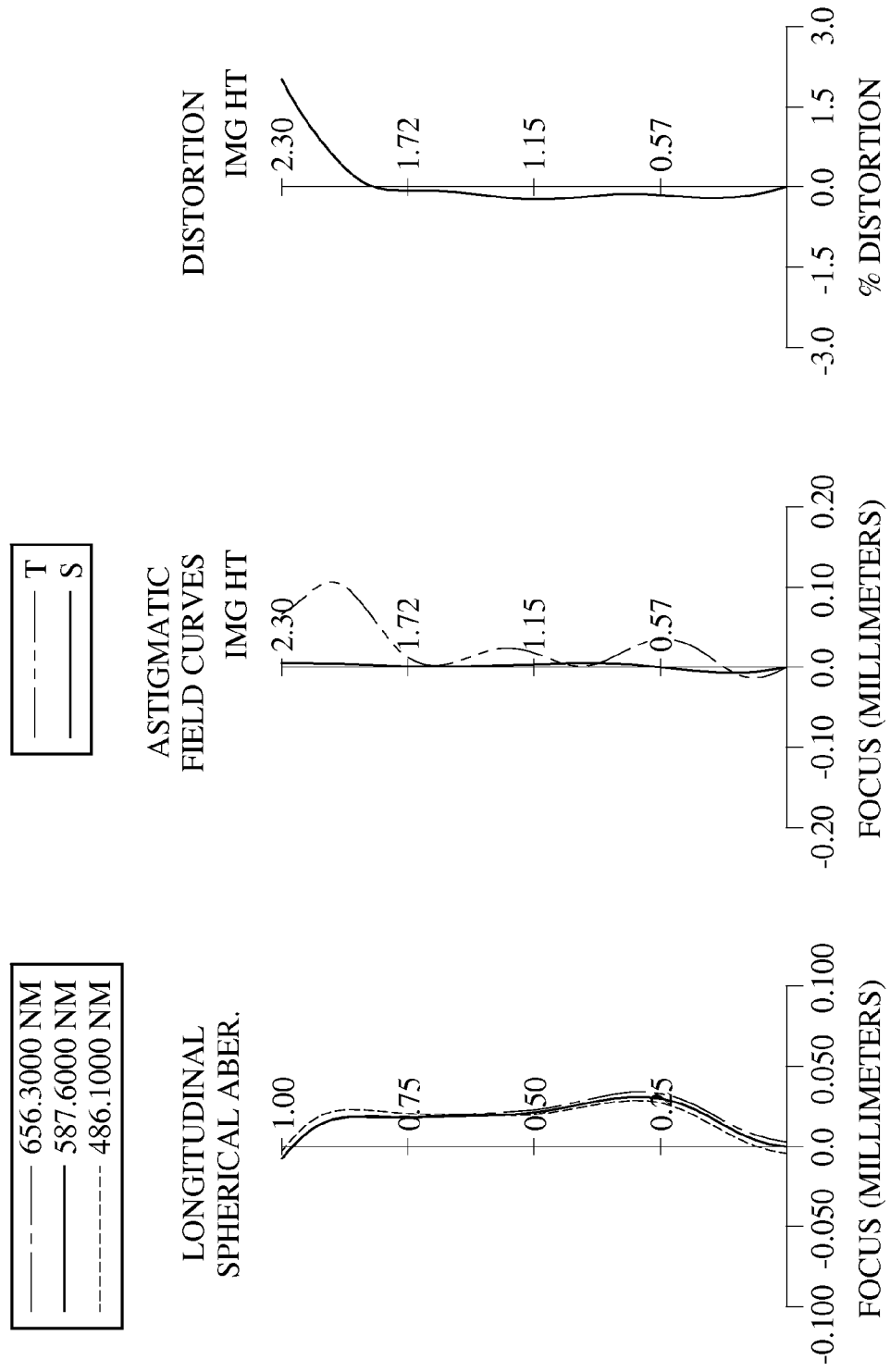
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, an aperture stop 500, a first lens element 510, a second lens element 520, a third lens element 530, a fourth lens element 540, a fifth lens element 550, an IR-cut filter 560 and an image surface 570, wherein the optical imaging lens assembly has a total of five lens elements (510-550). There is an air gap in a paraxial region between every two of the first lens element 510, the second lens element 520, the third lens element 530, the fourth lens element 540 and the fifth lens element 550 that are adjacent to each other.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has at least one convex shape in an off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Both of the object-side surface 531 and the image-side surface 532 of the third lens element 330 have at least on inflection point.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex shape in an off-axis region thereof.

The IR-cut filter 560 is made of glass and located between the fifth lens element 550 and the image surface 570, and will not affect the focal length of the optical imaging lens assembly. The image sensor 580 is disposed on or near the image surface 570 of the optical imaging lens assembly.

The detailed optical data of the 5th embodiment are shown in Table 9 and the aspheric surface data are shown in Table 10 below.

TABLE 9

5th Embodiment
f = 2.65 mm, Fno = 2.45, HFOV = 40.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.088 | | | | |
| 2 | Lens 1 | 1.201 (ASP) | 0.240 | Plastic | 1.639 | 23.5 | −13.78 |

TABLE 9-continued

5th Embodiment
f = 2.65 mm, Fno = 2.45, HFOV = 40.2 deg.

| Surface # | | Curvature Radius | Thickness | Material | Index | Abbe # | Focal Length |
|---|---|---|---|---|---|---|---|
| 3 | | 0.974 (ASP) | 0.069 | | | | |
| 4 | Lens 2 | 1.792 (ASP) | 0.409 | Plastic | 1.544 | 55.9 | 1.69 |
| 5 | | −1.727 (ASP) | 0.030 | | | | |
| 6 | Lens 3 | 6.624 (ASP) | 0.240 | Plastic | 1.639 | 23.5 | −6.06 |
| 7 | | 2.410 (ASP) | 0.483 | | | | |
| 8 | Lens 4 | −1.081 (ASP) | 0.400 | Plastic | 1.639 | 23.5 | −7.37 |
| 9 | | −1.606 (ASP) | 0.030 | | | | |
| 10 | Lens 5 | 0.839 (ASP) | 0.500 | Plastic | 1.544 | 55.9 | 7.17 |
| 11 | | 0.844 (ASP) | 0.600 | | | | |
| 12 | IR-cut filter | Plano | 0.300 | Glass | 1.517 | 64.2 | — |
| 13 | | Plano | 0.248 | | | | |
| 14 | Image | Plano | — | | | | |

Note:
Reference wavelength (d-line) is 587.6 nm.

TABLE 10

Aspheric Coefficients

| Surface # | | | | | |
|---|---|---|---|---|---|
| | 2 | 3 | 4 | 5 | 6 |
| k = | −4.4309E+00 | −2.6651E+00 | −7.8242E+00 | −9.0000E+01 | −9.0000E+01 |
| A4 = | 2.4356E−02 | 1.0280E−02 | 9.9178E−02 | −1.8298E+00 | −1.8494E−01 |
| A6 = | −3.3591E−01 | −6.4708E−01 | −1.8414E−01 | 1.4023E+01 | 2.8916E−01 |
| A8 = | −5.9200E−01 | 1.7915E+00 | 7.1031E−01 | −8.3871E+01 | −1.0212E−01 |
| A10 = | 1.1825E+00 | −4.7084E+00 | −2.9093E−01 | 3.4324E+02 | −7.2522E−01 |
| A12 = | −2.0658E+00 | −5.8453E−01 | −1.5156E+00 | −8.6297E+02 | 1.6311E+00 |
| A14 = | — | — | −8.9499E−01 | 1.2084E+03 | −1.5003E+00 |
| A16 = | — | — | — | −7.0439E+02 | — |

| Surface # | | | | | |
|---|---|---|---|---|---|
| | 7 | 8 | 9 | 10 | 11 |
| k = | −7.0093E+00 | −2.3589E+01 | −2.5141E+00 | −2.0748E+00 | −2.3322E+00 |
| A4 = | −1.5937E−01 | −8.6650E−01 | 2.5073E−01 | −4.6362E−01 | −3.0604E−01 |
| A6 = | −2.7711E−03 | 6.5529E+00 | −1.3169E+00 | 2.0106E−01 | 2.1369E−01 |
| A8 = | −5.1237E−01 | −3.8846E+01 | 2.2307E+00 | 2.6730E−01 | −8.3745E−02 |
| A10 = | 1.2537E+00 | 1.3033E+02 | −4.9209E−01 | −4.5566E−01 | 1.0813E−02 |
| A12 = | −1.9641E+00 | −2.4969E+02 | −3.2399E+00 | 2.7768E−01 | 2.3500E−03 |
| A14 = | 9.7090E−01 | 2.4738E+02 | 3.8488E+00 | −7.8995E−02 | −8.3535E−04 |
| A16 = | — | −9.7186E+01 | −1.2972E+00 | 8.7553E−03 | 6.0831E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.65 | Td/ΣAT | 3.92 |
| Fno | 2.45 | R3/R4 | −1.04 |
| HFOV [deg.] | 40.2 | (R7 + R8)/(R7 − R8) | −5.12 |
| V1 + V3 + V4 | 70.5 | f/f1 | −0.19 |
| CT2/CT5 | 0.82 | (f/f2) + (f/f5) | 1.94 |
| T34/CT4 | 1.21 | f4/f3 | 1.22 |
| Dr1r6/Dr7r10 | 1.06 | | |

6th Embodiment

Figure 11:
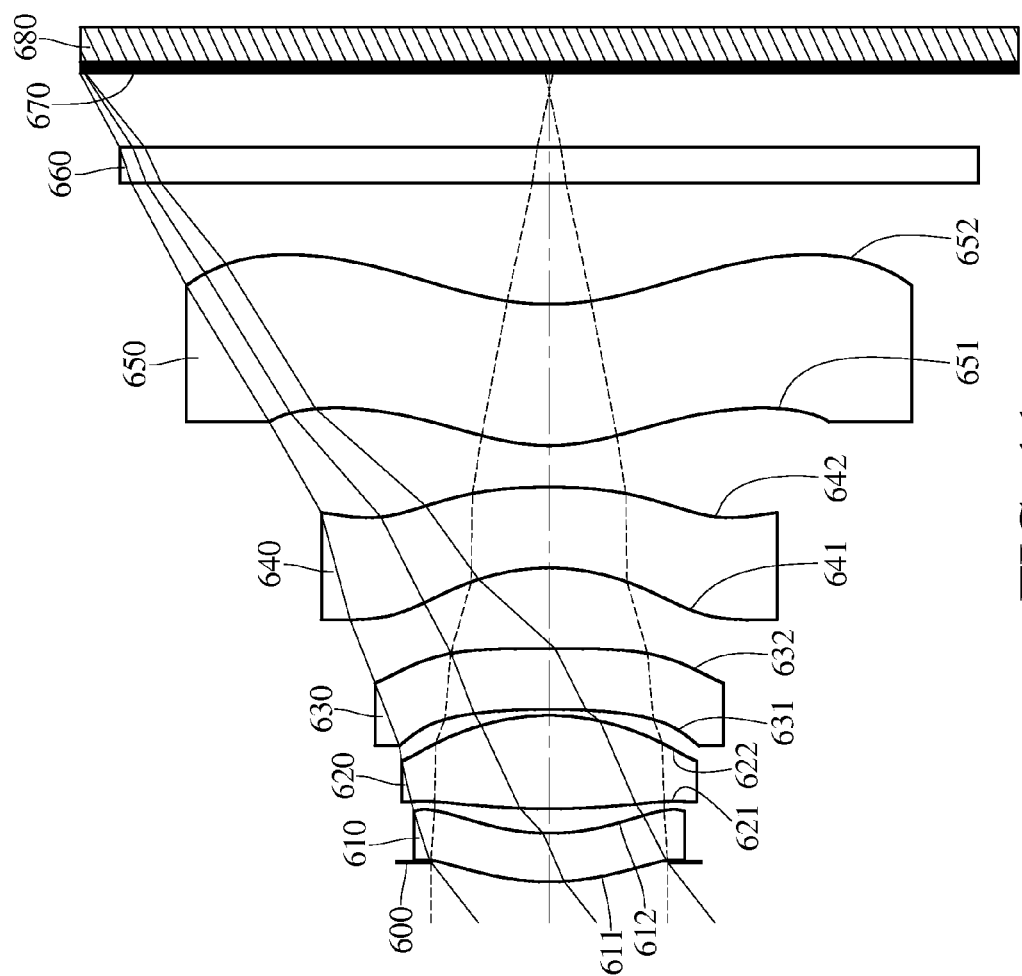
FIG. 11 is a schematic view of an image capturing unit according to the 6th embodiment of the present disclosure.
Figure 12:
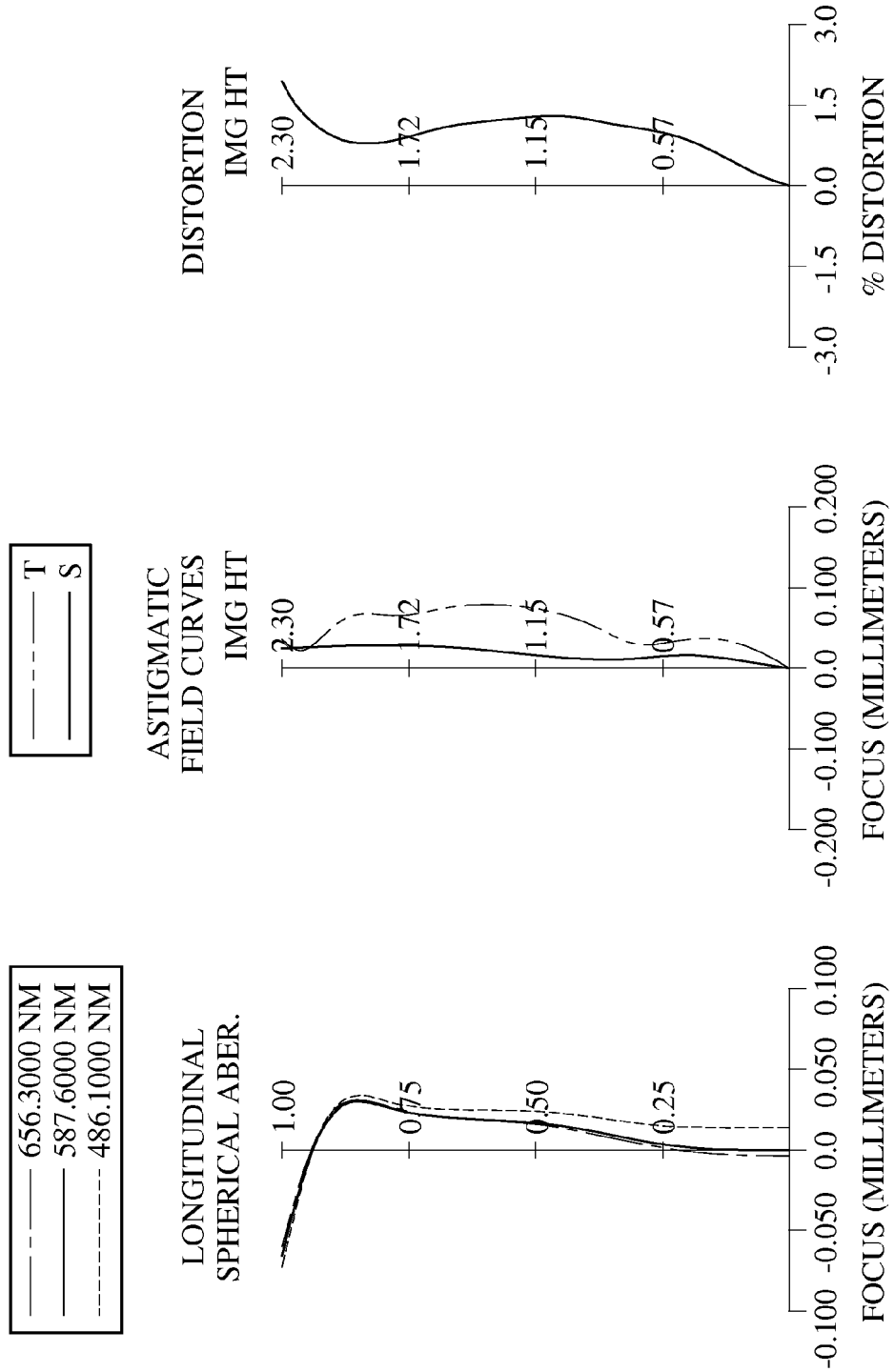
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, an aperture stop 600, a first lens element 610, a second lens element 620, a third lens element 630, a fourth lens element 640, a fifth lens element 650, an IR-cut filter 660 and an image surface 670, wherein the optical imaging lens assembly has a total of five lens elements (610-650). There is an air gap in a paraxial region between every two of the first lens element 610, the second lens element 620, the third lens element 630, the fourth lens element 640 and the fifth lens element 650 that are adjacent to each other.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has at least one convex shape in an off-axis region thereof.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. Both of the object-side surface 631 and the image-side surface 632 of the third lens element 330 have at least on inflection point.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex shape in an off-axis region thereof.

The IR-cut filter 660 is made of glass and located between the fifth lens element 650 and the image surface 670, and will not affect the focal length of the optical imaging lens assembly. The image sensor 680 is disposed on or near the image surface 670 of the optical imaging lens assembly.

The detailed optical data of the 6th embodiment are shown in Table 11 and the aspheric surface data are shown in Table 12 below.

TABLE 11

6th Embodiment
f = 2.86 mm, Fno = 2.45, HFOV = 38.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.098 | | | | |
| 2 | Lens 1 | 1.210 (ASP) | 0.240 | Plastic | 1.639 | 23.5 | −27.22 |
| 3 | | 1.044 (ASP) | 0.121 | | | | |
| 4 | Lens 2 | 3.369 (ASP) | 0.463 | Plastic | 1.544 | 55.9 | 1.53 |
| 5 | | −1.054 (ASP) | 0.030 | | | | |
| 6 | Lens 3 | −3.270 (ASP) | 0.300 | Plastic | 1.639 | 23.5 | −5.33 |
| 7 | | −84.864 (ASP) | 0.400 | | | | |
| 8 | Lens 4 | −1.081 (ASP) | 0.400 | Plastic | 1.639 | 23.5 | −2.84 |
| 9 | | −3.065 (ASP) | 0.206 | | | | |
| 10 | Lens 5 | 0.952 (ASP) | 0.700 | Plastic | 1.530 | 55.8 | 3.82 |
| 11 | | 1.339 (ASP) | 0.600 | | | | |
| 12 | IR-cut filter | Plano | 0.175 | Glass | 1.517 | 64.2 | — |
| 13 | | Plano | 0.367 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | −3.2026E+00 | −8.2496E+00 | −7.0430E+00 | −3.9628E+00 | −1.0000E+00 |
| A4 = | −2.2329E−02 | 5.0339E−01 | −1.0545E−01 | 2.5331E−01 | 2.5626E−01 |
| A6 = | −3.4163E−01 | −2.2293E+00 | −8.8656E−03 | −3.4842E+00 | −2.9479E+00 |
| A8 = | −2.4386E−01 | 3.9628E+00 | 6.4169E−01 | 1.3823E+01 | 9.9041E+00 |
| A10 = | 7.4018E−01 | −5.2053E+00 | −1.6611E+00 | −2.3982E+01 | −2.0335E+01 |
| A12 = | −2.3789E+00 | −2.9064E−02 | 4.8181E−01 | −5.4091E+00 | 1.5644E+01 |
| A14 = | — | — | −8.9488E−01 | 6.8137E+01 | — |
| A16 = | — | — | — | −5.6136E+01 | — |

| | Surface # | | | | |
|---|---|---|---|---|---|
| | 7 | 8 | 9 | 10 | 11 |
| k = | −7.0093E+00 | −3.0316E+00 | −1.0001E+00 | −7.2672E+00 | −1.1065E+00 |
| A4 = | −3.8942E−01 | −1.6878E−01 | −5.4550E−01 | −4.1305E−03 | −1.5373E−01 |
| A6 = | 3.0876E−02 | −5.2483E−01 | 1.3281E+00 | −3.5351E−01 | −8.1162E−02 |
| A8 = | −5.1237E−01 | 2.0446E+00 | −2.2652E+00 | 5.3205E−01 | 1.5556E−01 |
| A10 = | 1.5851E+00 | 1.5448E+00 | 3.6862E+00 | −3.8381E−01 | −1.0249E−01 |

TABLE 12-continued

| Aspheric Coefficients | | | | | |
|---|---|---|---|---|---|
| A12 = | −1.3176E+00 | −4.4204E+00 | −3.5712E+00 | 1.3813E−01 | 3.5187E−02 |
| A14 = | 3.6437E−01 | 4.3280E+00 | 1.7013E+00 | −1.8889E−02 | −6.2630E−03 |
| A16 = | 1.0927E−01 | −1.3248E+00 | −3.1427E−01 | −5.8314E−04 | 4.5475E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.86 | Td/ΣAT | 3.78 |
| Fno | 2.45 | R3/R4 | −3.20 |
| HFOV [deg.] | 38.0 | (R7 + R8)/(R7 − R8) | −2.09 |
| V1 + V3 + V4 | 70.5 | f/f1 | −0.11 |
| CT2/CT5 | 0.66 | (f/f2) + (f/f5) | 2.62 |
| T34/CT4 | 1.00 | f4/f3 | 0.53 |
| Dr1r6/Dr7r10 | 0.88 | | |

The foregoing image capturing unit is able to be installed in, but not limited to, an electronic device, including smart phones, tablet personal computers and wearable apparatus. According to the present disclosure, the optical imaging lens assembly has a total of five lens elements. The first lens element with negative refractive power and the second lens element with positive refractive power are favorable for easily capturing the incident light from the peripheral region of the image scene so as to provide wider field of view and improve the image quality. Furthermore, the third lens element and the fourth lens element having negative refractive power are favorable for correcting the field curvature resulting from the second lens element and reducing the total track length of the optical imaging lens assembly so as to maintain a compact size thereof. When specific conditions are satisfied, it is favorable for preventing the fourth lens element from molding problems and the axial distance between the third lens element and the fourth lens element from becoming too large, thereby keeping the optical imaging lens assembly compact. Moreover, it is favorable for properly arranging the refractive power of the third lens element and the fourth lens element so as to prevent the imbalanced refractive power distribution of the optical imaging lens assembly, thereby reducing the sensitivity of the optical imaging lens assembly. In addition, it is favorable for correcting the chromatic aberration and the astigmatism of the optical imaging lens assembly. According to the present disclosure, the optical imaging lens assembly simultaneously satisfies the requirements of wide field of view, high image quality and compact size.

The foregoing description, for the purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:

a first lens element with negative refractive power having an image-side surface being concave in a paraxial region thereof;

a second lens element having positive refractive power;

a third lens element having negative refractive power;

a fourth lens element with negative refractive power having an object-side surface being concave in a paraxial region thereof; and a fifth lens element with positive refractive power having an object-side surface being convex in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric;

wherein the optical imaging lens assembly has a total of five lens elements; there is an air gap in a paraxial region between every two of the first lens element, the second lens element, the third lens element, the fourth lens element and the fifth lens element that are adjacent to each other;

wherein an axial distance between the third lens element and the fourth lens element is T34, a central thickness of the fourth lens element is CT4, a focal length of the third lens element is f3, a focal length of the fourth lens element is f4, and the following conditions are satisfied:

$$0 < T34/CT4 < 1.85; \text{ and}$$

$$f4/f3 < 10.0.$$

2. The optical imaging lens assembly of claim 1, wherein the image-side surface of the first lens element has at least one convex shape in an off-axis region thereof.

3. The optical imaging lens assembly of claim 1, wherein the focal length of the third lens element is f3, the focal length of the fourth lens element is f4, and the following condition is satisfied:

$$f4/f3 < 5.0.$$

4. The optical imaging lens assembly of claim 1, wherein a curvature radius of an object-side surface of the second lens element is R3, a curvature radius of an image-side surface of the second lens element is R4, and the following condition is satisfied:

$$-2.5 < R3/R4 < -0.4.$$

5. The optical imaging lens assembly of claim 1, wherein a curvature radius of the object-side surface of the fourth lens element is R7, a curvature radius of an image-side surface of the fourth lens element is R8, and the following condition is satisfied:

(R7+R8)/(R7−R8)<0.

6. The optical imaging lens assembly of claim 1, wherein an Abbe number of the first lens element is V1, an Abbe number of the third lens element is V3, an Abbe number of the fourth lens element is V4, and the following condition is satisfied:

V1+V3+V4<120.

7. The optical imaging lens assembly of claim 1, wherein an axial distance between an object-side surface of the first lens element and the image-side surface of the fifth lens element is Td, a sum of axial distances being respectively between every two of the first lens element, the second lens element, the third lens element, the fourth lens element and the fifth lens element that are adjacent to each other is ΣAT, and the following condition is satisfied:

3.6<Td/ΣAT<6.0.

8. The optical imaging lens assembly of claim 1, wherein a focal length of the optical imaging lens assembly is f, a focal length of the second lens element is f2, a focal length of the fifth lens element is f5, and the following condition is satisfied:

1.25<(f/f2)+(f/f5)<4.0.

9. The optical imaging lens assembly of claim 1, wherein the third lens element has an image-side surface being concave in a paraxial region thereof, and at least one of an object-side surface and the image-side surface of the third lens element has at least one inflection point.

10. The optical imaging lens assembly of claim 1, wherein the axial distance between the third lens element and the fourth lens element is T34, the central thickness of the fourth lens element is CT4, and the following condition is satisfied:

0.30<T34/CT4<1.65.

11. The optical imaging lens assembly of claim 1, wherein an axial distance between an object-side surface of the first lens element and an image-side surface of the third lens element is Dr1r6, an axial distance between the object-side surface of the fourth lens element and the image-side surface of the fifth lens element is Dr7r10, and the following condition is satisfied:

Dr1r6/Dr7r10<1.0.

12. The optical imaging lens assembly of claim 1, wherein a focal length of the optical imaging lens assembly is f, a focal length of the first lens element is f1, and the following condition is satisfied:

−0.25<f/f1<0.

13. An image capturing unit, comprising:
the optical imaging lens assembly of claim 1; and
an image sensor, wherein the image sensor is disposed on the image side of the optical imaging lens assembly.

14. An electronic device, comprising:
the image capturing unit of claim 13.

15. An optical imaging lens assembly comprising, in order from an object side to an image side:
a first lens element with negative refractive power having an image-side surface being concave in a paraxial region thereof;
a second lens element having positive refractive power;
a third lens element having negative refractive power;
a fourth lens element with negative refractive power having an object-side surface being concave in a paraxial region thereof and an image-side surface being convex in a paraxial region thereof; and
a fifth lens element having an image-side surface being concave in a paraxial region thereof, wherein the image-side surface of the fifth lens element has at least one convex shape in an off-axis region thereof, and both of an object-side surface and the image-side surface of the fifth lens element are aspheric;
wherein the optical imaging lens assembly has a total of five lens elements; there is an air gap in a paraxial region between every two of the first lens element, the second lens element, the third lens element, the fourth lens element and the fifth lens element that are adjacent to each other;
wherein an axial distance between the third lens element and the fourth lens element is T34, a central thickness of the fourth lens element is CT4, an Abbe number of the first lens element is V1, an Abbe number of the third lens element is V3, an Abbe number of the fourth lens element is V4, and the following conditions are satisfied:

0<T34/CT4<1.85; and

V1+V3+V4<120.

16. The optical imaging lens assembly of claim 15, wherein an axial distance between an object-side surface of the first lens element and the image-side surface of the fifth lens element is Td, a sum of axial distances being respectively between every two of the first lens element, the second lens element, the third lens element, the fourth lens element and the fifth lens element that are adjacent to each other is ΣAT, and the following condition is satisfied:

3.6<Td/ΣAT<6.0.

17. The optical imaging lens assembly of claim 15, wherein the Abbe number of the first lens element is V1, the Abbe number of the third lens element is V3, the Abbe number of the fourth lens element is V4, and the following condition is satisfied:

V1+V3+V4<90.

18. The optical imaging lens assembly of claim 15, wherein a curvature radius of an object-side surface of the second lens element is R3, a curvature radius of an image-side surface of the second lens element is R4, and the following condition is satisfied:

—2.5<R3/R4<−0.4.

19. The optical imaging lens assembly of claim 15, wherein at least one of an object-side surface and an image-side surface of the third lens element has at least one inflection point.

20. The optical imaging lens assembly of claim 15, wherein a focal length of the optical imaging lens assembly is f, a focal length of the second lens element is f2, a focal length of the fifth lens element is f5, and the following condition is satisfied:

1.25<(f/f2)+(f/f5)<4.0.

21. The optical imaging lens assembly of claim 15, wherein a focal length of the third lens element is f3, a focal length of the fourth lens element is f4, and the following condition is satisfied:

f4/f3<10.0.

22. The optical imaging lens assembly of claim 21, wherein the focal length of the third lens element is f3, the focal length of the fourth lens element is f4, and the following condition is satisfied:

$$f4/f3<5.0.$$

23. The optical imaging lens assembly of claim 15, wherein a central thickness of the second lens element is CT2, a central thickness of the fifth lens element is CT5, and the following condition is satisfied:

$$CT2/CT5<1.40.$$

24. The optical imaging lens assembly of claim 23, wherein the central thickness of the second lens element is CT2, the central thickness of the fifth lens element is CT5, and the following condition is satisfied:

$$CT2/CT5<1.0.$$

25. An image capturing unit, comprising:
the optical imaging lens assembly of claim 15; and
an image sensor, wherein the image sensor is disposed on the image side of the optical imaging lens assembly.

26. An electronic device, comprising:
the image capturing unit of claim 25.

* * * * *